United States Patent
Wang (10) Patent No.: US 8,345,853 B2
(45) Date of Patent: Jan. 1, 2013

(54) METHOD FOR PROCESSING AN INCOMING CALL

(75) Inventor: Zhengwei Wang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1798 days.

(21) Appl. No.: 11/565,098

(22) Filed: Nov. 30, 2006

(65) Prior Publication Data

US 2007/0160186 A1 Jul. 12, 2007

Related U.S. Application Data (63) Continuation of application No. PCT/CN2005/000788, filed on Jun. 6, 2005.

(30) Foreign Application Priority Data

Jun. 7, 2004 (CN) .......................... 2004 1 0037182

(51) Int. Cl.
*H04M 3/42* (2006.01)
*H04L 12/66* (2006.01)

(52) U.S. Cl. .................................. 379/210.02; 370/352

(58) Field of Classification Search ............... 379/88.01, 379/201.02, 218.01, 142, 201.07, 201.08, 379/207, 210, 211.02, 211.03, 211.04, 221; 704/275; 709/246; 455/412, 407, 408, 415, 455/425, 459, 556, 432.3, 433, 461; 370/352, 370/353, 354, 355, 356, 357

See application file for complete search history.

(56) References Cited

U.S. PATENT DOCUMENTS

| | | | |
|---|---|---|---|
| 4,998,291 A | | 3/1991 | Marui et al. |
| 6,430,289 B1 * | | 8/2002 | Liffick .......................... 370/352 |
| 6,618,473 B1 | | 9/2003 | Davis |
| 6,631,182 B1 | | 10/2003 | Schwab et al. |
| 7,039,165 B1 * | | 5/2006 | Saylor et al. ................ 379/88.18 |
| 2002/0098831 A1 * | | 7/2002 | Castell et al. .................. 455/413 |
| 2002/0128033 A1 * | | 9/2002 | Burgess ......................... 455/528 |
| 2002/0168055 A1 * | | 11/2002 | Crockett et al. ............ 379/88.01 |
| 2002/0196922 A1 * | | 12/2002 | Marwell et al. ........... 379/218.01 |

(Continued)

FOREIGN PATENT DOCUMENTS

CN 1350391 A 5/2002

(Continued)

OTHER PUBLICATIONS

European Office Action for European Application No. 05752247.6, dated May 12, 2009.

(Continued)

*Primary Examiner* — Ahmad Matar
*Assistant Examiner* — Kharye Pope (57) ABSTRACT

A method for processing an incoming call, includes: an accessing call mark being preset in a called terminal; the called terminal, on receiving a call initiated by a calling party, determining whether the call contains the accessing call mark of the called terminal; if the call contains the accessing call mark of the called terminal, the called terminal putting through the call; otherwise, the called terminal terminating the call. The invention may solve the problems caused by various methods used in the prior art to avoid being disturbed by phone calls, such as missing important calls, extra service fee, partial protection against harassing telephone calls, and etc. The solution may ensure that the called user will not be disturbed by unimportant calls or harassing calls when the called user does not want to be disturbed, while ensuring that the called user will not miss any important call.

23 Claims, 2 Drawing Sheets

U.S. PATENT DOCUMENTS

| | | | |
|---|---|---|---|
| 2003/0007625 A1* | 1/2003 | Pines et al. | 379/223 |
| 2003/0012149 A1* | 1/2003 | Maggenti et al. | 370/260 |
| 2003/0023440 A1* | 1/2003 | Chu | 704/249 |
| 2003/0084121 A1* | 5/2003 | De Boor et al. | 709/218 |
| 2003/0101283 A1* | 5/2003 | Lewis et al. | 709/246 |
| 2003/0156693 A1* | 8/2003 | Goldman | 379/142.01 |
| 2003/0220099 A1 | 11/2003 | Hama | |
| 2004/0114747 A1* | 6/2004 | Trandal et al. | 379/211.02 |
| 2004/0236836 A1* | 11/2004 | Appelman et al. | 709/206 |
| 2005/0210272 A1* | 9/2005 | Fotta | 713/188 |
| 2006/0285667 A1* | 12/2006 | Hodge | 379/142.05 |
| 2007/0275708 A1* | 11/2007 | Henderson | 455/415 |

FOREIGN PATENT DOCUMENTS

| | | | |
|---|---|---|---|
| CN | 1391422 A | | 1/2003 |
| CN | 1441584 A | | 9/2003 |
| DE | 19847286 A1 | | 4/2000 |
| EP | 0 319 210 A2 | | 6/1989 |
| EP | 0825751 A2 | | 2/1998 |
| GB | 2 203 614 | | 10/1988 |
| JP | 1155395 A | | 6/1989 |
| JP | 2001-298530 A | | 10/2001 |
| WO | 03/069877 A2 | | 8/2003 |

OTHER PUBLICATIONS

Chinese Office Action for Chinese Patent Application No. 200410037182.6, mailed Sep. 1, 2006, and partial English translation thereof.

English Translation of the Written Opinion of the International Searching Authority for International Application No. PCT/CN2005/000788, dated Jul. 19, 2005.

European Office Action for European Patent Application No. 05752247.6, dated Jan. 3, 2008.

European Office Action for European Patent Application No. 05752247.6, dated Sep. 9, 2008.

European Office Action for European Patent Application No. 05752247.6, dated May 8, 2009.

European Office Action for European Patent Application No. 05752247.6, dated Sep. 4, 2009.

Korean Office Action for Korean Patent Application No. 10-2006-7027158, dated Apr. 15, 2008, and English translation thereof.

Japanese Office Action for Japanese Application No. 2007-526175, dated Jan. 6, 2009, and English translation thereof.

* cited by examiner

METHOD FOR PROCESSING AN INCOMING CALL

CROSS-REFERENCE TO RELATED APPLICATIONS

This application is a continuation of International Application No. PCT/CN2005/000788 filed Jun. 5, 2005. This application claims the benefit of Chinese Patent Application No. 200410037182.6 filed on Jun. 7, 2004. The disclosures of the above applications are incorporated herein by reference.

FIELD

The present disclosure relates to the call technique in the communication field, and particularly, relates to a method for processing an incoming call.

BACKGROUND

The statements in this section merely provide background information related to the present disclosure and may not constitute prior art.

Along with the popularization of terminal devices such as fixed telephones and mobile phones, people's work and life have become more convenient as they may communicate with each other through the terminal devices at any time. However, terminal devices also bring troubles to their users. For example, as no user wants to be disturbed by unimportant phone calls at night or during leisure time, a user may turn off the terminal device, which, however, makes it possible for the user to miss important calls. If the user keeps the terminal on at night or during leisure time, there are indeed unimportant calls coming in during such periods, some of which are even harassing calls.

Terminal devices include fixed terminals and mobile terminals, and it is comparatively easy to turn off mobile terminals while the only way to turn off a fixed phone is to disconnect the telephone line, which is very inconvenient for the user. Moreover, turning off terminals, mobile or fixed, will bring other problems: the user will not get any phone calls when the terminal device is turned off, and others will not be able to contact the user even with very important business matters. And the user needs to turn on the terminal again when he needs to use the terminal. It is convenient to turn off or turn on mobile terminals, but it is common that a user forgets to turn on a fixed terminal. Thus the user will not get the phone calls from anyone through the terminal if it is not turned on again.

A user may also utilize the secretary service currently offered by a mobile communication system, but the service is applied to mobile terminals only. The user of a mobile terminal may customize the settings of his secretary station; for instance, the user who does not want to be disturbed by phone calls may request the secretary station to record voice messages for the calling users and send the messages to the called user. Therefore when the secretary receives a phone call for the user, it will ask the calling user to leave a message and then inform the called user by a short message or other means. The called user calls the secretary station to get the voice message left for him by the calling user. The called user may decide whether to call back according to the contents of the voice message, and thus will not be disturbed by incoming calls.

However, the secretary service is a paid service, i.e. the users of the service need to pay for it. The secretary station only converts incoming calls into short messages or other forms of notice to the called user, so the called user receives short messages or other messages instead of calls and is still somewhat disturbed. In this sense, the solution is not a perfect one. Besides, the short messages from the secretary station to the called user may be delayed or even lost, and the called user may not read the short messages in time. For example, as short messages are not real-time communication and users usually set gentle, weak or even mute short-message notifying sounds, it is common for a user to fail to handle a short message in time and accordingly fail to handle an urgent business in time.

Another solution is to set an incoming call filter. For instance, blacklists and whitelists can be used to protect users from the disturbance of unimportant phone calls while guaranteeing that important calls will never be missed. For example, the whitelist solution comprises: setting a whitelist of calling numbers that are allowed to access the called terminal; when the called terminal enables the whitelist function, only the calling numbers in the whitelist may access the called terminal. The whitelist solution may solve the above-mentioned problem to a large extent, but the authorized calling numbers are limited in the solution. When a user A needs to call a user C in emergency, although the cellular phone number of the user A is in the whitelist, the user A, as his cellular phone is out of power, may have to call with a user B's cellular phone, the number of which is not in the whitelist. In that case, the user A is unable to call through a number in the whitelist so that the user A will not be able to contact user C. The blacklist solution comprises: setting a blacklist of calling numbers that are not allowed to access the called terminal, when the called terminal enables the blacklist function, the incoming calls from the numbers in the blacklist will be refused. The blacklist solution is unable to block incoming calls from the number outside the blacklist. For example, harassing calls from public telephones are not blocked by the blacklist solution. What's more, the maintenance of the blacklist and the whitelist is complicated.

SUMMARY

A method for processing an incoming call, including:
setting an accessing call mark set in a called terminal;
the called terminal, on receiving a call initiated by a calling party, determining whether the call contains the accessing call mark of the called terminal; if the call contains the accessing call mark of the called terminal, putting through the call; otherwise, terminating the call.

According to the present solution, an accessing call mark is set in the called terminal. When the calling user initiates a call to the called terminal with a calling number, the called terminal can decide whether to process the current call according to the normal procedure by determining whether the call carries the accessing call mark of the called terminal. Moreover, a whitelist and a blacklist are set in the called terminal, enabling the called terminal to confine the calling numbers contained in the calling number registration list via the whitelist and blacklist, so that the terminal can control incoming calls in a more flexible and convenient way.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The key idea of the present invention mainly comprises: setting an accessing call mark in a called terminal; the called terminal, on receiving a call initiated by a calling party, determining whether the call contains the accessing call mark of the called terminal; if the call contains the accessing call mark of the called terminal, the called terminal processing the call according to the normal procedure; otherwise, the called terminal terminating the call. Processing the call following the normal procedure in accordance with this invention comprises putting through the call as in the prior art and notifying the user who uses the called terminal to receive the call, e.g. notifying the user with a ringing.

Specifically speaking, there are two modes to set an accessing call mark; correspondingly, the called terminal has two modes of processing. One mode comprises: taking the calling number as the accessing call mark; the other mode comprises: setting an accessing code and taking the accessing code as the accessing call mark. In accordance with the first processing mode, a function of recognizing the registration request, an accessing code and a calling number registration list are set in the called terminal; the calling user can record its calling number in the calling registration list by sending to the called terminal a registration request with the accessing code, so that the calling number is regarded as the accessing call mark; when the calling number calls the called terminal with the calling number, the called terminal determines whether the calling number, i.e. the accessing call mark is saved in the calling number registration list so as to decide whether to process the current call according to the normal procedure. In accordance with the second processing mode, an accessing code is set in the called terminal and regarded as the accessing call mark; when the calling user calls the called terminal, the called terminal determines whether the call carries the accessing code so as to decide whether to process the call according to the normal procedure.

The two modes are hereinafter illustrated in detail with reference to the accompanying drawings.

According to the first mode, the process of setting an accessing call mark is as follows: set the function of recognizing a registration request; and set by a called user an accessing code and a calling number registration list in the called terminal; when the called terminal receives a call initiated by a calling party, if the call is a registration request, the called terminal acquires the calling number to be registered from the call, and records the acquired calling number in the calling number registration list; thereby, the calling number which is allowed to access the called user is saved in the called terminal, i.e. the accessing call mark is saved in the called terminal. By such settings, if the call is not a registration request, the called terminal processes the call according to the normal procedure if the called terminal confirms that the calling number registration list contains the corresponding calling number of the call, namely contains the corresponding accessing call mark.

Figure 1:
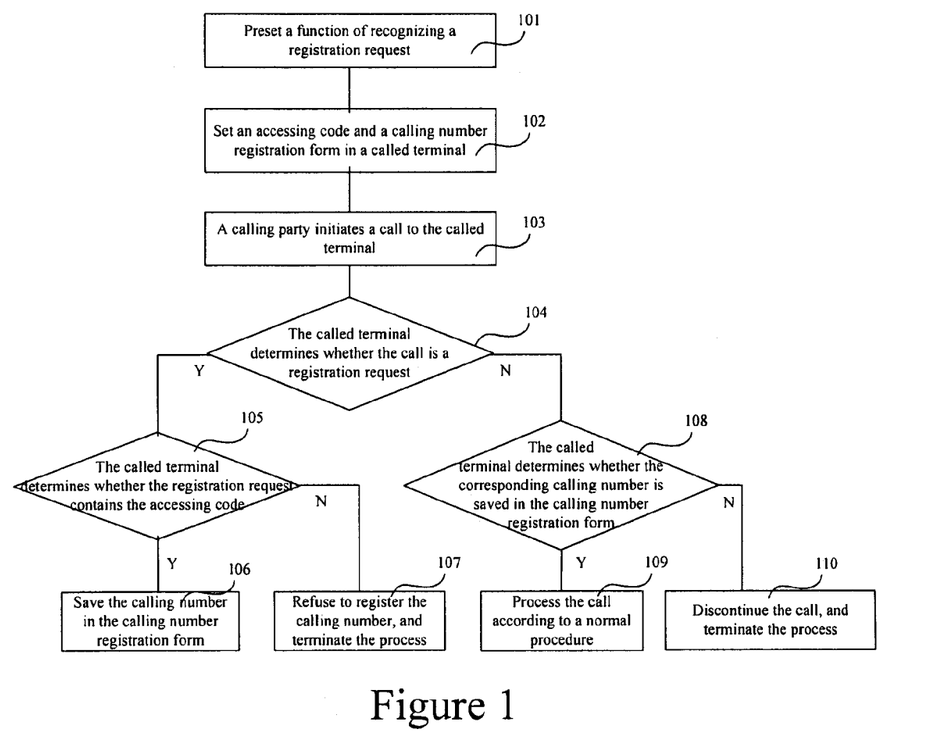
FIG. 1 is an implementing flowchart of an embodiment of the present invention.

The detailed process of the first mode is as shown in FIG. 1, which can be, for example, implemented by the steps as follows.

Step 101: a function of recognizing a registration request for registering the calling number is preset in a called terminal.

The registration request can be set as a short message, a multimedia short message, a User-to-User signal (UUS) or a voice call.

The function of recognizing a registration request can be set as follows: if a call received by the called terminal is a short message or a multimedia short message, the call is recognized as a registration request; or if a call received by the called terminal carries a registration request mark, the call is recognized as a registration request.

Step 102: an accessing code and a calling number registration list are set in the called terminal.

Usually, the accessing code is set by the called user. The called user, after setting the accessing code, can tell the accessing code to his relatives and friends, etc. so that they can contact the called user with the accessing code at any moment. The set calling number registration list is used for recording the calling number.

Step 103: a calling user initiates a call to the called terminal.

Step 104: the called terminal, when receiving the call, first determines whether the call is a registration request; if the call is a registration request, proceeds to Step 105; otherwise, proceeds to Step 108.

Since the function of recognizing a registration request has been set in Step 101 according to the embodiment of the invention, it can be determined according to the type of the received call whether the call is a registration request.

Step 105, the called terminal determines whether the registration request contains the accessing code set in the called terminal; if the registration request contains the accessing code, proceeds to Step 106; otherwise, proceeds to Step 107.

If the registration request is a short message, the accessing code and the calling number may be contained in the short message. Obviously, if the calling number to be registered is the calling number of the current call, the calling number may be transmitted to the called terminal via the calling number recognition, and here, the short message as the registration request needs only to contain the accessing code.

Step 106: the called terminal acquires the calling number from the call, and saves the calling number in the calling number registration list.

Step 107: the called terminal refuses to make the registration, and terminates the procedure.

Step 108: the called terminal determines whether the corresponding calling number of the call is contained in the calling number registration list of the called terminal; if the corresponding calling number of the call is contained in the calling number registration list, proceeds to Step 109; otherwise, proceeds to Step 110.

Step 109: the called terminal processes the call according to the normal procedure.

Step 110: the called terminal terminating the call, and terminates the procedure.

Because the call initiated by a calling user may be a short message, a multimedia short message, a UUS or a voice call, when the call is a short message, a multimedia short message or a UUS, the called terminal deletes the short message, the multimedia short message or the UUS to terminate the call; when the call is a voice call, the called terminal refuses to put through the voice call to terminate the call.

In addition, in the case that the registration request is a short message, a special mark may be set in the short message, and the mark is called a registration request mark. Thus, the called terminal, on receiving a call, first determines whether the call is a short message; if the call is a short message, the called terminal further determines whether a registration request mark is carried in the short message; if the registration request mark is carried in the short message, the short message is determined as a registration request, otherwise the short message is not determined as a registration request. Obviously, in the case that the registration request is a short message, the called terminal may alternatively be set as follows: after the current call is determined as a short message, the call is regarded as a registration request. Thus, when making the decision in Step 105, if the accessing code set by the called terminal is not carried in the registration request, the called terminal may process the call according to Step 108-Step 110 after denying the registration.

If the registration request is a voice call, the transmission of the registration message can be realized by converting the Dual Tone Multiple Frequency signal into a digital signal.

No matter which mode of registration request is adopted, if the calling number to be registered is the calling number of the current call, the calling number to be registered can be transmitted to the called terminal the calling number recognition. In some cases, the calling number to be registered is not the calling number of the current call. For example, if a short message is used as a registration request, a fixed terminal can not send the short message, thus, the calling user may use a mobile terminal which is able to send a short message to register the number of the fixed terminal to the calling number registration list in the called terminal such that the call initiated by the fixed terminal can be put through to the called terminal.

By the above steps, the embodiment of the present invention can be implemented.

In accordance with the embodiment of the present invention, a whitelist for saving the information of the calling numbers which can initiate a call to the called terminal may be further set in the called terminal. A call initiated by a user using a number in the whitelist as the calling number can access the called terminal. By such settings, in Step 104, the called terminal, before determining whether the call is a registration request, may first determine whether the corresponding calling number of the call has been contained in the whitelist. If the corresponding calling number of the call has been contained in the whitelist, the called terminal can directly put through the call; in other words, it is not necessary to save the calling number in the calling number registration list. As a result, even if the called terminal confirms that the call is a registration request, the called terminal may refuse to save the calling number in the calling number registration list, for example, the called terminal may directly terminate the call. Obviously, the called terminal, after confirming that the current call is a registration request and before determining whether the registration request contains the accessing code set by the called terminal, namely between Step 104 and Step 105, can determine whether the whitelist contains the corresponding calling number of the current call. If the whitelist contains the corresponding calling number of the current call, the called terminal will deny the registration directly, and terminate the present procedure.

Therefore, in the case that there is a whitelist, the calling number in the whitelist will not be contained in the calling number registration list. In Step 108, however, after inquiring the calling number registration list, if the corresponding calling number is not in the registration list, the called terminal will terminate the call. As a result, after setting the whitelist, the called terminal needs not only to determine whether the corresponding calling number of the current call is contained in the calling number registration list, but also to determine whether the calling number is contained in the whitelist; as long as any one of the calling number registration list and the whitelist contains the calling number, the corresponding call of the calling number should be put through. Obviously, in practice, the whitelist and the calling number registration list can be combined as one single list to be used.

In accordance with the embodiment of the present invention, a blacklist for saving the information of the calling numbers which can not initiate a call to the called terminal can be further set in the called terminal as well. When other users, using a number in the blacklist as the calling number, initiate a call to the called terminal, the called terminal will refuse to put through the call. By such settings, the called terminal, on receiving a call, can first determine whether the corresponding calling number of the call is contained in the blacklist; if the corresponding calling number of the call is contained in the blacklist, the subsequent processing steps need not be performed, and the procedure can be terminated directly. In other words, in Step 104, the called terminal, before determining whether the call is a registration request, should first determine whether the corresponding calling number of the call is contained in the blacklist; if the corresponding calling number of the call is contained in the blacklist, the called terminal will directly terminate the current call; if the corresponding calling number of the call is not contained in the blacklist, the called terminal will perform subsequent steps such as determining whether the call is a registration request.

In the case that a blacklist is set, there is another processing method as follows: the called terminal, before determining whether the registration request contains the preset accessing code, namely before Step 105, first determine whether the corresponding calling number of the call is contained in the blacklist; if the corresponding calling number of the call is contained in the blacklist, the calling number will not be contained in the calling number registration list; otherwise, the called terminal performs the subsequent processing steps.

In fact, a whitelist and a blacklist can be set in a called terminal simultaneously according to the embodiment of the present invention. Thus, if a certain calling number is contained in the whitelist, the called terminal can directly put through the corresponding call of the calling number; if a certain calling number is contained in the blacklist, the called terminal shall not save the calling number in the calling number registration list of the terminal itself.

When the above steps are performed, corresponding decisions should be made according to the blacklist and the whitelist. For example, a decision may be made first based either on the blacklist or the whitelist. The case that a decision is made based on the blacklist first is hereinafter taken as an example to describe the process.

In the case that a blacklist is set, after receiving a call, namely before Step 104, the called terminal determines whether the corresponding calling number of the call is contained in the blacklist; if the corresponding calling number of the call is contained in the blacklist, the called terminal terminates the current procedure directly; if the corresponding calling number of the call is not contained in the blacklist, the called terminal further determines whether the corresponding calling number of the call is contained in the whitelist. When making a decision according to the whitelist, the called terminal determines whether the corresponding calling number of the call has been contained in the whitelist before determining whether the call is a registration request; if the corresponding calling number of the call has been contained in the whitelist, when the call is confirmed as a registration request, the called terminal refuse to save the calling number in the calling number registration list; if the corresponding calling number of the call has not been contained in the whitelist, the called terminal performs the subsequent steps according to the procedure as shown in FIG. 1. Obviously, when making a decision according to the whitelist, the called terminal, after confirming that the call is a registration request and before determining whether the registration request contains the set accessing code, namely between Step 104 and Step 105, may determine whether the corresponding calling number of the call has been save in the whitelist; if the corresponding calling number of the call has been save in the whitelist, the called terminal will refuse the registration directly; if the corresponding calling number of the call has not been save in the whitelist, the subsequent steps will be performed according to the procedure as shown in FIG. 1.

Obviously, the called terminal, after confirming that the current call is a registration request and before determining whether the registration request contains the set accessing code, namely between Step 104 and Step 105, may further determine whether the corresponding calling number of the call has been contained in the whitelist or blacklist; if the corresponding calling number of the call has been contained in the whitelist or blacklist, the called terminal will terminate the current procedure directly; if the called terminal confirms that the accessing code is contained in neither the whitelist nor the blacklist, the called terminal will perform the subsequent steps.

In the case that the whitelist and blacklist are set simultaneously, if the current call is not a registration request, in Step 110, the called terminal, before terminating the current call, should determine whether the corresponding calling number of the call is contained in the whitelist; if the corresponding calling number of the call is contained in the whitelist, the called terminal will process the call according to the normal procedure; otherwise, the called terminal will terminate the current call.

In accordance with the embodiment of the present invention, the calling number information may be contained in any one of the calling number registration list, the whitelist and the blacklist of the called terminal. For example, if the whitelist and/or the blacklist are set in the called terminal, after a certain calling number is set in the whitelist or the blacklist of the called terminal, the called terminal should determine whether the calling number registration list has contained the same calling number; if the calling number registration list has contained the calling number, the calling number will be deleted from the calling number registration list. If a calling number is set in the blacklist, the called terminal should check whether the same calling number is contained in the whitelist; if the calling number is contained in the whitelist, the calling number will be deleted from the whitelist. If a calling number is set in the whitelist, the called terminal should check whether the same calling number is contained in the blacklist; if the calling number is contained in the blacklist, the calling number will be deleted from the blacklist.

The above description is that of the first mode, namely the case that the calling number is set as the accessing call mark. The second mode is hereinafter described in detail.

Figure 2:
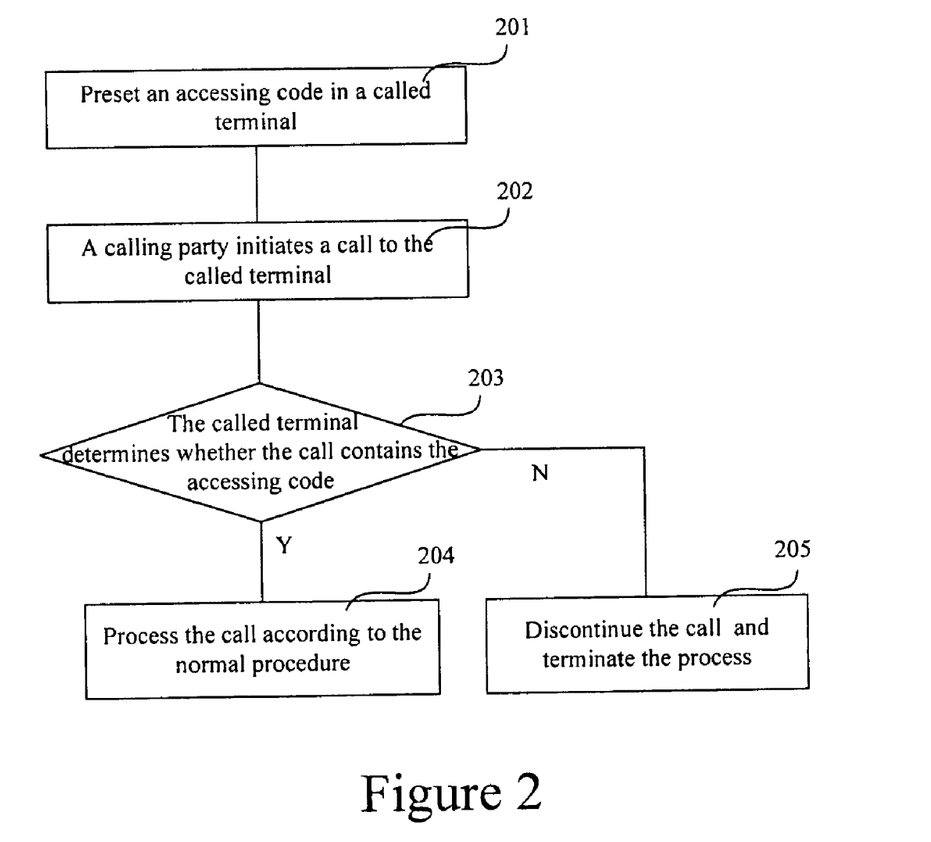
FIG. 2 is an implementing flowchart of another embodiment of the present invention.

The detailed process of the second mode is as shown in FIG. 2, which can be, for example, implemented by the steps as follows.

Step 201: an accessing code is preset in a called terminal.

In practice, the accessing code is set by the called user. The called user, after setting the accessing code, may tell the accessing code to his relatives and friends, so that they can communicate with the called user with the accessing code at any time.

Step 202: a calling user initiates a call to the called terminal.

The call initiated by the calling party could be a short message, a multimedia short message, a UUS or a voice call. If the call initiated by the calling is a short message, a multiple media short message or a UUS, the accessing code can be carried in the message, for example, taking *# as the beginning identifier of the accessing code and the follow-on information as the accessing code.

Steps 203-205: the called terminal, on receiving the call, determines whether the call contains the accessing code set by itself; if the call contains the accessing code, the called terminal will process the call according to the normal procedure; otherwise, the called terminal will terminate the call, and terminate the procedure.

Since the call initiated by the calling may be a short message, a multimedia short message, a UUS or a voice call, when the called terminal terminates the current call, the terminating steps are same as the corresponding steps in the first mode. In other words, the called terminal deletes the short message, the multimedia short message or the UUS to terminate the call; or the called terminal refuses to put through the current voice call or terminates the current voice call to terminate the call.

If the call is a short message, a multimedia short message or a UUS, the called terminal may determine whether the current call carries an accessing code according to the beginning identifier *#.

If the call is a voice call, the called terminal, on receiving the call, can first connect or put through the call, and automatically play the prompting sound to prompt the calling party to input the accessing code; Obviously, it is necessary to preset the sound to be played in the called terminal; if the called does not receive the accessing code sent by the calling within a set time period, the called determines that the call does not contain the accessing code; otherwise, the called determines that the call contains the accessing code. Here, processing the call according to the normal procedure means that the called terminal notifies the called user of an incoming call, and for example, the called terminal notifies the called user with a ringing; and terminating the call means terminating the call or the session directly.

If the accessing code is transmitted by means of other calling information, the called terminal can directly determine whether the call contains the accessing code according to the information carried in the call, and determine whether to put through the call or to refuse the call according to the determination. Accordingly, processing the call according the normal procedure means that the called terminal puts through the call and notifies the called user of an incoming call, and for example, the called terminal notifies the called user with a ringing; and terminating the call means directly refusing to put through the call.

In practice, in the case that the call is a voice call, when the called terminal prompts the calling party to input the accessing code, the calling party can send the accessing code to the communication network by means of Dual Tone Multiple Frequency (DTMF) signals, Frequency Shift Keying (FSK) signals, signal or voice. Then the called terminal can receive the accessing code from the communication network in the above four modes. If the called terminal has a function of receiving a voice call sent by the calling party, the called terminal may receive the call information directly; otherwise, the communication network need to transform the voice call sent by the calling party into the format which can be recognized by the called terminal, and send the transformed call information to the called terminal.

The transmission process will be described in detail hereinafter by taking the case that the calling sends the accessing code by DTMF signals as an example. Specifically speaking, the calling party can transmit the accessing code via the communication network by means of DTMF signals; the termination switch in the communication network, on receiving the DTMF signals, determines whether the called terminal has the function of converting a DTMF signal into a digital signal. If the called terminal has the function of converting a DTMF signal into a digital signal, the DTMF signal is forwarded to the called terminal directly, and the called terminal converts the DTMF signal into the digital signal of the accessing code. If the called terminal has no function of converting a DTMF signal into a digital signal, the termination switch converts the DTMF signal into the format which can be recognized by the called terminal; and after that, the converted information will be sent to the called terminal, and the called terminal will perform the digital signal conversion according to the format.

In practice, the processing performed by the termination switch, which converts the DTMF signal into the format which can be recognized by the called terminal, can also be completed by the originator switch. For example, the accessing code, which is sent to the mobile terminal by the fixed terminal through DTMF signals, can be converted into digital signals directly by the originator switch; and after that, the communication network can transmit the accessing code to the called terminal by means of the digital signals.

In the case of transmitting the accessing code in the voice mode, if the called terminal supports the function of voice recognition, the called terminal can prompt the calling party to send the accessing code by means of voice; the called terminal, after receiving the voice information, can acquire the accessing code sent by the calling party through voice recognition.

The processing in the other modes is similar, and will no longer be described here.

Obviously, the called terminal, after acquiring the accessing code, needs to further determine whether the accessing code is the accessing code of itself.

Similar to the above first mode, a whitelist or a blacklist can be set in the called terminal, and the whitelist and the blacklist can be set in the called terminal simultaneously as well.

In the case that a whitelist is set, the called terminal, on receiving a call initiated by a calling party, first determines whether the corresponding calling number of the call is contained in the whitelist; if the corresponding calling number of the call is contained in the whitelist, the called terminal directly process the call according to the normal procedure; otherwise, the determining process in Step 203 will be performed.

In the case that a blacklist is set, the called terminal, on receiving a call initiated by a calling party, first determines whether the corresponding calling number of the call is contained in the blacklist; if the corresponding calling number of the call is contained in the blacklist, the called terminal will terminate the call directly; otherwise, the called terminal will perform the determining process in Step 203.

In the case that a whitelist and a blacklist is simultaneously set, the called terminal can still determine first whether the corresponding calling number of the call is contained in the whitelist; if the calling number is contained in the whitelist, the call will be processed according to the normal procedure; otherwise, the called terminal determines whether the calling number is contained in the blacklist; if the calling number is contained in the blacklist, the called terminal will terminate the call directly; if the calling number is contained in neither the blacklist nor the whitelist, the determining process in Step 203 will be performed.

Obviously, the calling party and the called terminal mentioned in the above description may be a mobile terminal, a fixed terminal, a Personal Digital Assistant (PDA), a portable device, or other terminal with a communication function.

The foregoing is only preferred embodiments of the invention and is not to be used to limit the protection scope thereof.

What is claimed is:

1. A method for processing an incoming call, comprising:
a called terminal receiving a call from a calling party;
the called terminal determining whether the call is a registration request;
in response to a determination that the call is a registration request, the called terminal determining whether the calling number of the calling party has been registered to the called terminal;
in response to a determination that the calling number of the calling party has been registered to the called terminal, the called terminal putting through the call; otherwise, the called terminal determining whether the registration request contains an accessing code for allowing registering the calling number to the called terminal;
in response to a determination that the registration request contains the accessing code, the called terminal acquiring the calling number from the registration request and saving the calling number in a calling number registration list in the called terminal;
in response to a determination that the registration request does not contain the accessing code, the called terminal refusing the registration and terminating the procedure;
in response to a determination that the call is not a registration request, the called terminal determining whether the calling number of the call is contained in the calling number registration list in the called terminal,
in response to a determination that the calling number of the call is contained in the calling number registration list in the called terminal, the called terminal putting through the call; otherwise, the called terminal terminating the call.

2. The method according to claim 1, wherein a whitelist containing calling numbers is set in the called terminal;
before the called terminal determines whether the registration request contains the accessing code, the method further comprises:
determining whether the corresponding calling number of the call is contained in the whitelist, if the corresponding calling number of the call is contained in the whitelist, the called terminal terminating the procedure; otherwise, the called terminal performing the step of determining whether the registration request contains the accessing code.

3. The method according to claim 1, wherein a blacklist saving calling numbers is set in the called terminal;
before the called terminal determines whether the call is a registration request, the method further comprises:
determining whether the corresponding calling number of the call is contained in the blacklist, if the corresponding calling number of the call is contained in the blacklist, terminating the process; otherwise, performing the step of determining whether the call is a registration request.

4. The method according to claim 1, wherein a blacklist saving calling numbers is set in the called terminal;
before the called terminal determines whether the registration request contains the accessing code, the method further comprises:
determining whether the corresponding calling number of the call is contained in the blacklist, if the corresponding calling number of the call is contained in the blacklist, refusing the registration and terminating the process; otherwise, performing the step of determining whether the registration request contains the accessing code.

5. The method according to claim 1, wherein a whitelist saving calling numbers and a blacklist saving calling numbers are set in the called terminal;
before the called terminal determines whether the call is a registration request, the method further comprises:
c1. the called terminal determining whether the corresponding calling number of the call is contained in the blacklist; if the corresponding calling number of the call is contained in the blacklist, terminating the process; otherwise, proceeding to Step c2;
c2. the called terminal further determining whether the calling number is contained in whitelist; if the calling number is contained in whitelist, proceeding to Step c3; otherwise, skipping step c3;
c3. determining whether the call is a registration request; if the call is a registration request, terminating the procedure; otherwise, putting through the call.

6. The method according to claim 1, wherein a whitelist saving calling numbers and a blacklist saving calling numbers are set in the called terminal;
before the called terminal determines whether the call is a registration request, the method further comprises:
the called terminal determining whether the corresponding calling number of the call is contained in the blacklist; if the corresponding calling number of the call is contained in the blacklist, terminating the process; otherwise, performing the step of determining whether the call is a registration request;
before the called terminal determines whether the registration request contains the accessing code, the method further comprises:
the called terminal determining whether the corresponding calling number of the call is contained in the whitelist; if the corresponding calling number of the call is contained in the whitelist, terminating the procedure; otherwise, performing the step of determining whether the registration request contains the accessing code.

7. The method according to 1, wherein a whitelist saving calling numbers and a blacklist saving calling numbers are set in the called terminal;
before the called terminal determines whether the registration request contains the accessing code, the method further comprises:
determining whether the corresponding calling number of the call is contained in the whitelist or the blacklist; if the corresponding number of the call is contained in the whitelist, terminating the procedure; if the corresponding number of the call is contained in the blacklist, directly terminating the call; if the corresponding number of the call is contained in neither the whitelist nor the blacklist, performing the step of determining whether the registration request contains the preset accessing code.

8. The method according to claim 2, after a whitelist is set, further comprising:
the called terminal determining whether a calling number contained in the whitelist has been contained in the calling number registration list of the called terminal; if a calling number contained in the whiter list has been contained in the calling number registration list of the called terminal, deleting the calling number from the calling number registration list.

9. The method according to claim 5, after a whitelist is set, further comprising:
the called terminal determining whether a calling number contained in the whitelist has been contained in the calling number registration list of the called terminal; if a calling number contained in the whiter list has been contained in the calling number registration list of the called terminal, deleting the calling number from the calling number registration list.

10. The method according to claim 6, after a whitelist is set, further comprising:
the called terminal determining whether a calling number contained in the whitelist has been contained in the calling number registration list of the called terminal; if a calling number contained in the whiter list has been contained in the calling number registration list of the called terminal, deleting the calling number from the calling number registration list.

11. The method according to claim 7, after a whitelist is set, further comprising:
the called terminal determining whether a calling number contained in the whitelist has been contained in the calling number registration list of the called terminal; if a calling number contained in the whiter list has been contained in the calling number registration list of the called terminal, deleting the calling number from the calling number registration list.

12. The method according to claim 3, after a blacklist is set, further comprising:
the called terminal determining whether a calling number contained in the blacklist has been contained in the calling number registration list of the called terminal; if a calling number contained in the blacklist has been contained in the calling number registration list of the called terminal, deleting the calling number from the calling number registration list.

13. The method according to claim 4, after a blacklist is set, further comprising:
the called terminal determining whether a calling number contained in the blacklist has been contained in the calling number registration list of the called terminal; if a calling number contained in the blacklist has been contained in the calling number registration list of the called terminal, deleting the calling number from the calling number registration list.

14. The method according to claim 5, after a blacklist is set, further comprising:
the called terminal determining whether a calling number contained in the blacklist has been contained in the calling number registration list of the called terminal; if a calling number contained in the blacklist has been contained in the calling number registration list of the called terminal, deleting the calling number from the calling number registration list.

15. The method according to claim 6, after a blacklist is set, further comprising:
the called terminal determining whether a calling number contained in the blacklist has been contained in the calling number registration list of the called terminal; if a calling number contained in the blacklist has been contained in the calling number registration list of the called terminal, deleting the calling number from the calling number registration list.

16. The method according to claim 7, after a blacklist is set, further comprising:

the called terminal determining whether a calling number contained in the blacklist has been contained in the calling number registration list of the called terminal; if a calling number contained in the blacklist has been contained in the calling number registration list of the called terminal, deleting the calling number from the calling number registration list.

17. The method according to claim 1, wherein the registration request is a short message;

the step of determining whether the call is a registration request comprises:

determining whether the currently received call is a short message, if the received call is a short message, confirming that the call is a registration request; otherwise, confirming that the call is not a registration request;

if the called terminal refuses the registration request, and before the end of the procedure, the method further comprises:

processing the short message according to the normal procedure.

18. The method according to claim 1, wherein the registration request is a short message in which a mark of registration request is set;

the called terminal determining whether the call is a registration request comprises:

determining whether the currently received call is a short message; if the received call is a short message, further determining whether the mark of registration request is carried in the short message; if the mark of registration request is carried in the short message, confirming that the call is a registration request; if the mark of registration request is not carried in the short message, confirming that the call is not a registration request.

19. The method according to claim 1, wherein a whitelist saving calling numbers is set in the called terminal;

before the called terminal terminates the call, the method further comprises:

determining whether the corresponding calling number of the call is contained in the whitelist; if the corresponding calling number of the call is contained in the whitelist, putting through the call, otherwise, performing the step of terminating the call.

20. The method according to claim 1, wherein, when the call initiated by the calling is a short message, a multimedia short message, or user-to-user signal; the called terminal terminating the current call comprises:

deleting the call information currently received.

21. The method according to claim 1, wherein, when the call initiated by the calling party is a voice call, the called terminal terminating the current call comprises:

refusing to putting through the call; or terminating the call.

22. A terminal capable of processing an incoming call, comprising:

a receiving module, adapted to receive a call from a calling party;

a determining module, adapted to determine whether the call is a registration request for registering a calling number of the call;

an apparatus capable of registering a calling number;

the determining module further adapted to determine, in response to a determination that the call is a registration request, whether the calling number of the calling party has been registered by the apparatus;

the determining module further adapted to determine, in response to a determination that the call is not a registration request, whether the calling number of the call has been contained in a calling number registration list in the terminal;

the determining module further adapted to put through the call in response to a determination that the calling number of the call has been contained in a calling number registration list in the terminal;

the determining module further adapted to terminate the call in response to a determination that the calling number of the call has not been contained in the calling number registration list in the terminal;

the apparatus capable of registering a calling number further comprising:

a module adapted to receive the registration request from a calling party;

a module adapted to determine whether the registration request contains an accessing code for allowing registering a calling number to the called terminal; and a module adapted to obtain the calling number of the calling party from the registration request and save the calling number if the registration request contains the accessing code as well as refusing the registration request if the registration request does not contain the accessing code.

23. The terminal according to claim 22, wherein the terminal is a mobile terminal, a fixed terminal, a personal digital assistant (PDA), or a portable device.

* * * * *